United States Patent
Ferris et al.

(10) Patent No.: US 8,612,615 B2
(45) Date of Patent: Dec. 17, 2013

(54) SYSTEMS AND METHODS FOR IDENTIFYING USAGE HISTORIES FOR PRODUCING OPTIMIZED CLOUD UTILIZATION

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 425 days.

(21) Appl. No.: 12/952,930

(22) Filed: Nov. 23, 2010

(65) Prior Publication Data

US 2012/0131174 A1    May 24, 2012

(51) Int. Cl.
    G06F 15/16    (2006.01)
(52) U.S. Cl.
    USPC ......................................... 709/229
(58) Field of Classification Search
    USPC .................................... 709/217, 223–229
    See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 8,046,468 B2 * | 10/2011 | Isci et al. | 709/226 |
| 8,291,416 B2 * | 10/2012 | Cartales | 718/1 |
| 2001/0039497 A1 | 11/2001 | Hubbard | |
| 2002/0002478 A1 * | 1/2002 | Swart et al. | 705/8 |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |

(Continued)

OTHER PUBLICATIONS

Morgan, "Systems and Methods for Detecting Resource Consumption Events Over Sliding Intervals in Cloud-Based Network", U.S. Appl. No. 13/149,235, filed May 31, 2011.

(Continued)

*Primary Examiner* — Sargon Nano
(74) *Attorney, Agent, or Firm* — Lowenstein Sandler LLP (57) ABSTRACT

Embodiments relate to systems and methods for identifying usage histories for producing optimized utilization in a cloud-based network. In particular, a target cloud can receive usage histories corresponding to end user usage in a respective set of other clouds. In embodiments, the target cloud can simulate an execution of the usage histories on resources in the target cloud to generate a set of utilization ratios. Further, the target cloud can determine a desirable usage history from the set of utilization ratios based on highly optimized resource usage within the target cloud. In embodiments, an administrator of the target cloud can provide a deployment recommendation to an administrator of the cloud associated with the desirable usage history.

18 Claims, 6 Drawing Sheets

(56) References Cited

U.S. PATENT DOCUMENTS

| | | |
|---|---|---|
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala |
| 2009/0276771 A1 | 11/2009 | Nickolov et al. |
| 2009/0287691 A1 | 11/2009 | Sundaresan et al. |
| 2009/0293056 A1* | 11/2009 | Ferris .............................. 718/1 |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0010944 A1* | 1/2010 | Cheng et al. .................... 706/12 |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0076863 A1* | 3/2010 | Golomb .......................... 705/27 |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0250746 A1* | 9/2010 | Murase .......................... 709/226 |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0004683 A1* | 1/2011 | Kottomtharayil et al. ..... 709/224 |
| 2011/0016214 A1* | 1/2011 | Jackson ......................... 709/226 |
| 2011/0055034 A1 | 3/2011 | Ferris et al. |
| 2011/0055377 A1* | 3/2011 | Dehaan .......................... 709/224 |
| 2011/0055378 A1 | 3/2011 | Ferris et al. |
| 2011/0055396 A1 | 3/2011 | DeHaan |
| 2011/0055398 A1 | 3/2011 | DeHaan et al. |
| 2011/0055588 A1 | 3/2011 | DeHaan |
| 2011/0106519 A1* | 5/2011 | Samper et al. ................... 703/22 |
| 2011/0131335 A1 | 6/2011 | Spaltro et al. |
| 2011/0138051 A1* | 6/2011 | Dawson et al. ............... 709/226 |
| 2011/0151892 A1* | 6/2011 | Vengroff et al. ............ 455/456.3 |
| 2011/0213712 A1* | 9/2011 | Hadar et al. .................... 705/80 |
| 2011/0231552 A1* | 9/2011 | Carter et al. .................. 709/226 |
| 2011/0246635 A1* | 10/2011 | Phukan ......................... 709/223 |
| 2011/0264805 A1* | 10/2011 | Breitgand et al. ............ 709/226 |
| 2012/0030356 A1* | 2/2012 | Fletcher ........................ 709/226 |
| 2012/0131594 A1* | 5/2012 | Morgan ......................... 718/105 |

OTHER PUBLICATIONS

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federations Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,780, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

"rBuilder and the rPath Appliance Platform", 2007 rPath, Inc., www.rpath.com, 3 pgs.

White Paper—"rPath Versus Other Software Appliance Approaches", Mar. 2008, rPath, Inc., www.rpath.com, 9 pgs.

White Paper—"Best Practices for Building Virtual Appliances", 2008 rPath, Inc., www.rpath.com, 6 pgs.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments" U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al, "Methods and Systems for Verifying Software License Compliance in Cloud Computing Environments", U.S. Appl. No. 12/627,643, filed Nov. 30, 2009.

Ferris et al, "Systems and Methods for Service Aggregation Using Graduated Service Levels in a Cloud Network", U.S. Appl. No. 12/628,112, filed Nov. 30, 2009.

Ferris et al, "Methods and Systems for Generating a Software License Knowledge Base for Verifying Software License Compliance in Cloud Computing Environments", U.S. Appl. No. 12/628,156, filed Nov. 30, 2009.

Ferris et al, "Methods and Systems for Converting Standard Software Licenses for Use in Cloud Computing Environments", U.S. Appl. No. 12/714,099, filed Feb. 26, 2010.

Ferris et al, "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

(56) References Cited

OTHER PUBLICATIONS

Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Ferris et al., "Systems and Methods for Combinatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "System and Methods for Migrating Subscribed Services from a Set of Clouds to a Second Set of Clouds", U.S. Appl. No. 12/957,281, filed Nov. 30, 2001.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in Set of Multiple Host Clouds", U.S. Appl. No. 12/954,400, filed Novemeber 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al. "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.

\* cited by examiner

SYSTEMS AND METHODS FOR IDENTIFYING USAGE HISTORIES FOR PRODUCING OPTIMIZED CLOUD UTILIZATION

FIELD

The present teachings relate to systems and methods for identifying usage histories for producing optimized cloud utilization, and more particularly to platforms and techniques for securing cloud users that can improve resource efficiency within a target cloud.

BACKGROUND OF RELATED ART

Cloud computing environments utilize shared resources, software, and information that can be provided for use by end users. For example, a service level agreement (SLA) can be entered into between a vendor, such as an independent software vendor (ISV), and a cloud network provider whereby the cloud network provider agrees to commit an amount of resources associated with virtual machines in the cloud network for use by end users during operation of software products and applications of the vendor. In return, the cloud network provider can charge the vendor a specified rate in proportion to the amount of committed resources. The cloud network provider provides or maintains an amount of resources in the cloud network, such as server uptime, persistent storage, software application instantiation, network performance, cloud storage, support response time, and other elements. The operation of the resources by the end users generates a usage history associated with the cloud network that details consumption amounts and patterns, and other metrics.

An administrator of the cloud network may wish to optimize usage of the resources within the cloud network. More particularly, the administrator may want end users to utilize all, or substantially all, of the resources within the cloud network, thereby optimizing usage of the available resources, revenue streams, and other factors. However, it is sometimes the case that the actual utilization rate of the resources by the end users is not maximized or optimal. Further, an administrator of the cloud network may desire to locate an existing usage rate that would optimize the usage of the resources of the cloud network.

Therefore, it may be desirable to provide systems and methods for identifying usage histories for producing optimized cloud utilization. In particular, it may be desirable to secure cloud users that can improve or optimize resource usage efficiency within a target cloud by examining sets of usage histories of diverse users.

DESCRIPTION OF EMBODIMENTS

Embodiments of the present teachings relate to systems and methods for identifying usage histories for producing optimized cloud utilization. In particular, embodiments relate to platforms and techniques for securing cloud users that can improve, maximize, and/or optimize resource usage efficiency within a target cloud. The target cloud can have a specified amount of resources to be utilized by, for example, end users. For example, the resources of the cloud can be deployed as a Software as a Service (SaaS). An administrator of the target cloud can be motivated to achieve optimal usage of the resources in the target cloud. For example, the administrator may want to maintain as close as possible to 100% usage of the resources by end users accessing the resources. Optimal resource usage can lead to a more efficient service agreement, such as, for example, an SLA between the target cloud and a vendor, such as an ISV. In other embodiments, optimal usage of the resources in the target cloud can avoid underutilization and overutilization of the target cloud, therefore also avoiding the need to re-cloud or perform other service remedies.

According to embodiments, a target cloud can collect a set of usage histories associated with consumption data by end users of other cloud networks. The target cloud can determine, through running simulations, models, and/or other analysis of the usage histories on resources associated with the target cloud, a usage history that produces the most optimized utilization ratio of the resources in the target cloud. In embodiments, an administrator of the target cloud can generate a deployment recommendation or offer to the users or entities whose usage histories optimizes the utilization of the target cloud, in other embodiments, the administrator of the target cloud can offer, to the users or entities having the optimal user histories, discounts on subscriptions, longer or varying time frame subscriptions, better service options, various support options, and other offers or incentives. This can be in contrast to situations in which the target cloud is attempting to discover one or more entities whose usage histories would benefit from migration to the target cloud. Further, this can be in contrast to situations in which an individual resource, such as a virtual machine, is matched in and migrated to a new cloud. Instead, embodiments described herein relate to using a resource usage history of a set of resources and workloads in a predictive way by administrators to determine appropriate cloud deployment targets.

Embodiments as described herein can be implemented in or supported by a cloud network architecture. As used herein, a "cloud" can refer to a cloud-based network comprising a collection of resources that can be invoked to instantiate a virtual machine, process, or other resource for a limited or defined duration. As used herein, an "end user" can refer to a person, customer, subscriber, corporation, organization, or other entity accessing files and/or devices storing the files in the cloud. In embodiments, the end user can operate or manage computer software or hardware that can access files and/ or devices storing the files in the cloud-based network. Further, as used herein, an "administrator" of a cloud can refer to a person, owner, corporation, organization, or other entity having authoritative power to initialize, oversee, or otherwise manage the operation of a cloud.

As used herein, the "resources" of a cloud can refer to software or hardware such as, for example, applications, programs, servers, device drivers, storage such as hard drives, virtual memory, databases, random access memory (RAM) and other memory, processors, multimedia cards, and the like, in the cloud. The resources can be accessed by users or by software or applications independent from or associated with resources of the cloud. In embodiments, vendors such as ISVs can supply software resources for use with other resources in a cloud. Resources of the cloud can further refer to any communications resources, such as ports or channels provided to a virtual machine or other machine or process in the cloud. Resources can likewise include services, such as Web-based services deployed in the cloud, for example security or identity management services and/or other resources.

As used herein, "optimize" can be a general term that can refer to the best available option. In other words, an "optimized" configuration need not represent the best possible configuration, but instead can mean the preferred configuration of the possible configurations. Further, the term "optimize" can also mean maximize, enhance, improve, or other terms related to a preferred or improved performance level. Still further, as used herein, a "simulation" can refer to a projection, model, analysis, assessment, breakdown, evaluation, and other terms that can refer to any type of analysis of data.

Figure 1:
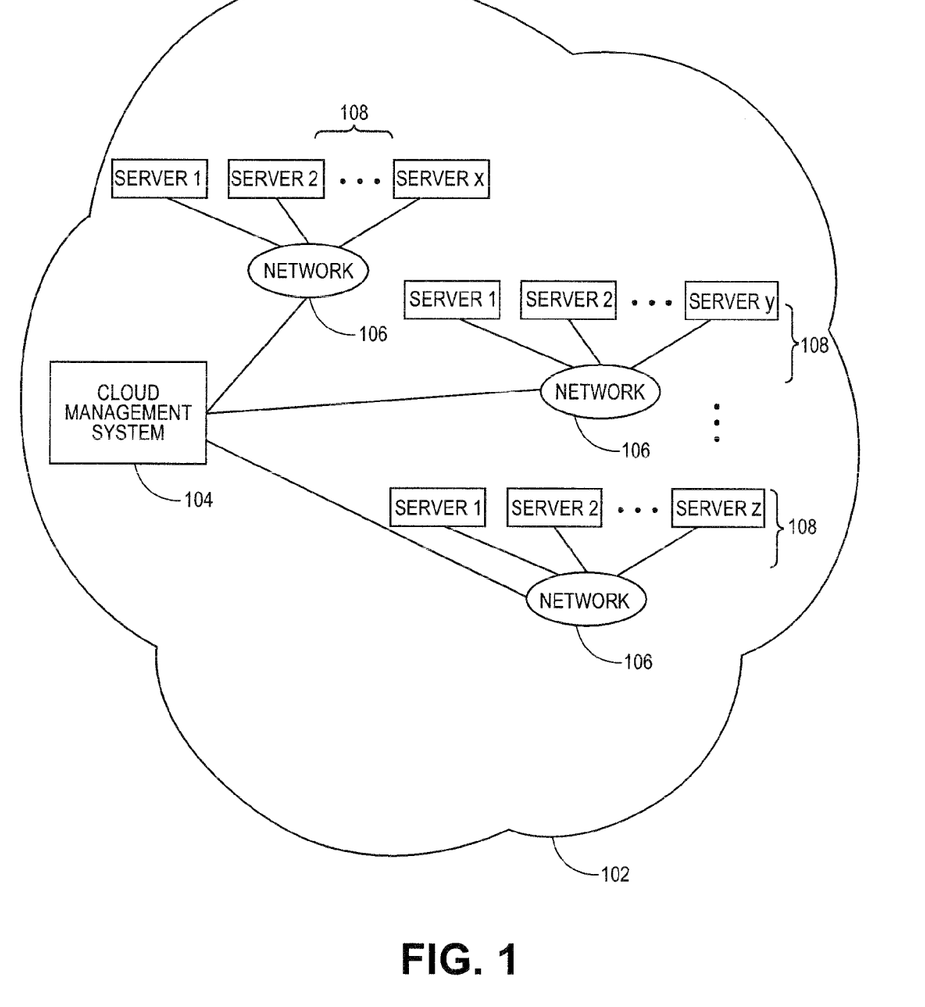
FIG. 1 illustrates an overall cloud system architecture in which various embodiments of the present teachings can be practiced.

FIG. 1 illustrates an overall cloud system architecture in which various embodiments of the present teachings can be practiced. As shown for example in FIG.1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further croup of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine that the user desires to invoke for its intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user desires to be available to each instance of the virtual machine or other resource. In embodiments, the requesting user can for instance specify a service level agreement (SLA) acceptable for their purposes. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more of the set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select groups of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in the set of resource servers 108. The cloud management system 104 can receive a confirmation message back from each participating server in the set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
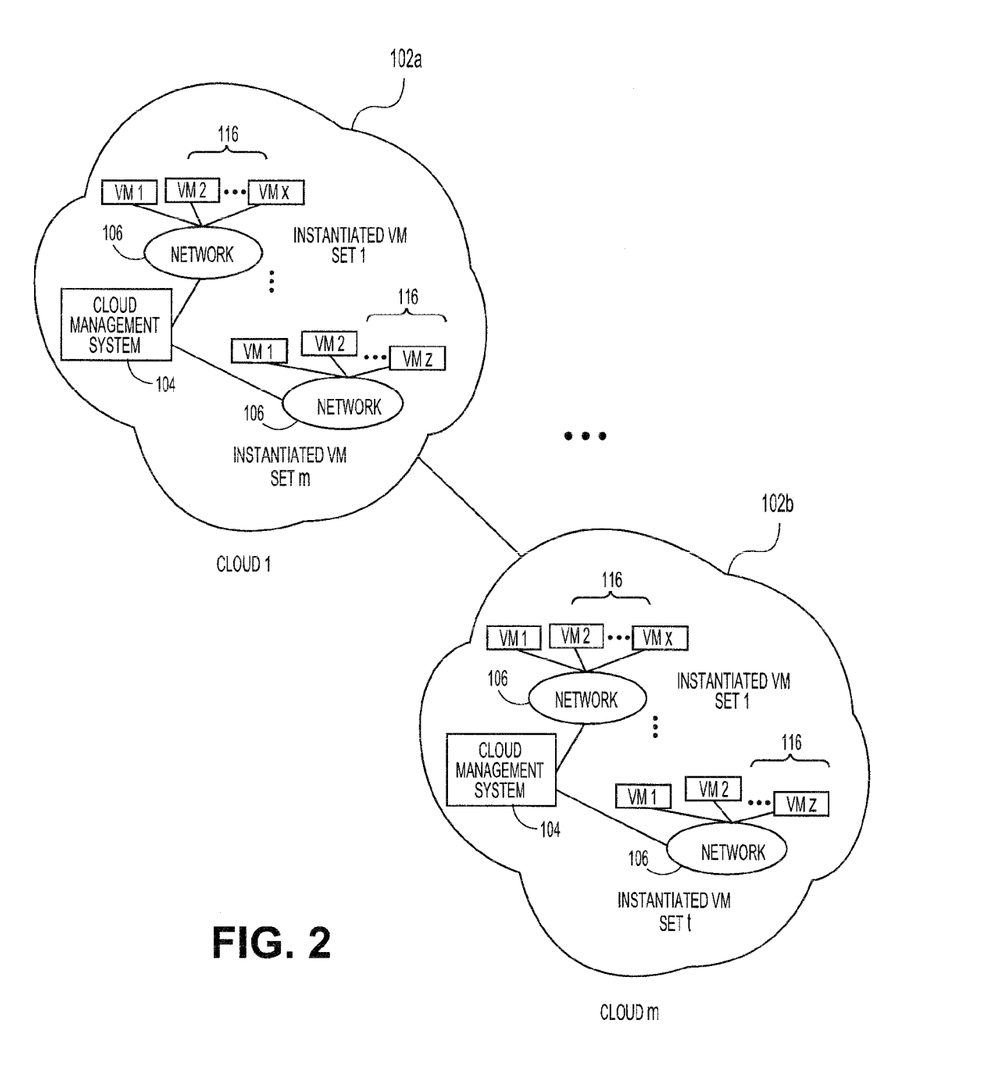
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108 (shown in FIG. 1). In embodiments, the cloud management system 104 can instantiate a given number, for example, 10, 500, 1000, or other numbers of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track, and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102a, 102b or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102a, 102b. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or within a short period of time on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or almost constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud 102a, 102b can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping, or successive times. The cloud management system 104 can, in such implementations, build, launch, and manage multiple sets of virtual machines based on the same or different underlying set of resource servers 108, with populations of different instantiated virtual machines 116 such as may be requested by different users. The cloud management system 104 can institute and enforce security protocols in a cloud 102a, 102b hosting multiple sets of virtual machines. Each of the individual sets of virtual machines can be hosted in a respective partition or sub-cloud of the resources of the main cloud 102a, 102b. The cloud management system 104 of a cloud can for example deploy services specific to isolated or defined sub-clouds, or isolate individual workloads/processes within the cloud to a specific sub-cloud. The subdivision of the cloud 102a, 102b into distinct transient sub-clouds or other subcomponents which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102a can also interact with a set of instantiated virtual machines or processes generated in a second, third or further cloud 102b. Further, the cloud management system 104 of the first cloud 102a can interface with the cloud management system 104 of the second cloud 102b, to coordinate those domains and operate the clouds and/or virtual machines or processes on a combined basis. The cloud management system 104 of a given cloud 102a, 102b can track and manage individual virtual machines or other resources instantiated in that cloud, as well as the set of instantiated virtual machines or other resources in other clouds.

Figure 3:
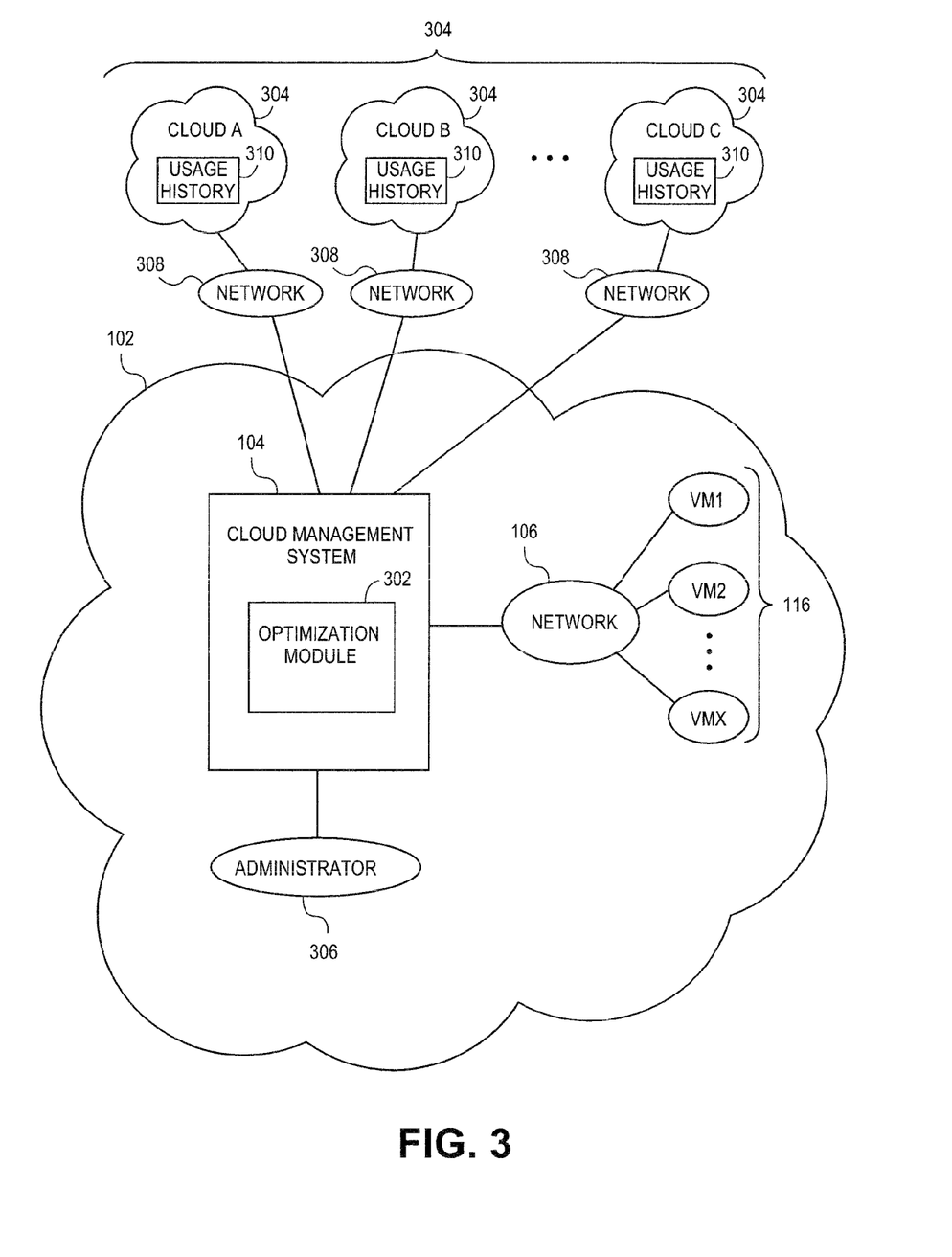
FIG. 3 illustrates an exemplary network configuration that can be used in systems and methods for identifying usage histories for producing optimized cloud utilization, according to various embodiments.

FIG. 3 illustrates an exemplary network configuration that can be used in systems and methods for identifying usage histories for producing optimized cloud utilization. In embodiments as shown, the cloud management system 104 can comprise an optimization module 302 configured to interface with an administrator 306 and with the set of instantiated virtual machines 116 via the network 106. The optimization module 302 can further be configured to interface with a set of clouds 304 via one or more other networks 308, or the network 106. It should be appreciated that the optimization module 302 can be implemented on other hardware and/or software components or can be configured to interface with the other components and entities described herein. Further, it should be appreciated that the optimization module 302 can be configured to interface with additional clouds (not shown in figures) and associated resources, such as virtual machines, of the additional clouds.

In embodiments, the administrator 306 can be any person, owner, corporation, organization, or other entity having authoritative power to initialize, oversee, or otherwise manage the operation of a target cloud 102. In embodiments, the administrator 306 can manage the delivery or provisioning of software applications, or other software, hardware, or other products or services, such as products and services of one or more ISVs (not shown in figures), to end users accessing the target cloud 102. In embodiments, the end users can access the set of instantiated virtual machines 116 located in the target cloud 102. It should be appreciated that the administrator 306 can enter into one or more service agreements with vendors or other entities to provide resources to end users in one or multiple clouds, and/or across multiple products and/or product lines.

The optimization module 302 can receive a set of usage histories 310 from the set of clouds 304 via the one or more networks 308. In embodiments, each of the set of usage histories 310 can comprise respective end user data within the set of clouds 304. For example, as shown in FIG. 3, cloud A can have an associated usage history 310, cloud B can have an associated user history 310, and so on. In embodiments, the set of usage histories 310 can comprise data related to the operation or consumption of any of the resources within the set of clouds 304. For example, the data can comprise any processing, consumption, storage, execution, or transfer data, or any other data or metrics related to the operation of any hardware, software, or other resources within the set of clouds 304 by the end users.

The optimization module 302 can simulate or model an execution of each of the set of usage histories 310 on resources within the target cloud 102, such as on the set of instantiated virtual machines 116. For example, the optimization module 302 can compare any processing power data in the received usage history data 310 to the processing power available on the set of instantiated virtual machines 116. For further example, the optimization module 302 can compare any file storage data in the received usage history data 310 to the data storage available on the set of instantiated virtual machines 116. For further example, the optimization module 302 can compare any file transfer data in the received usage history data 310 to the data transfer capability on the set of instantiated virtual machines 116. It should be appreciated that any consumption data or other metric within the usage histories 310 can be applied and analyzed with respect to the resources of the target cloud 102.

The optimization module 302 can determine, from the simulations, a utilization ratio of the resources in the target cloud 102 for each of the set of usage histories 310. In embodiments, the utilization ratio can be a percent usage rate of the resources in the target cloud 102 that results from the projected or simulated migration of a corresponding usage history 310. For example, the usage data 310 corresponding to cloud A of the set of clouds 304 can equate to 80% utilization of the resources in the target cloud 102, and the usage data corresponding to cloud B of the set of clouds 304 can equate to 65% utilization of the resources in the target cloud 102. The optimization module 302 can select a usage history of the set of usage histories that produced a highly optimized or preferred utilization ratio of the resources in the target cloud 102. For example, the optimization module 302 can determine which corresponding cloud 304 has a usage history with a utilization ratio closest to 100%, or other target percentages.

In embodiments, the utilization ratio can exceed the target percentage and still be deemed a preferred utilization ratio. For example, a utilization ratio of 102% is closer to 100% than is a utilization ratio of 95%. In these cases, the optimization module 302 can determine a configuration whereby a portion of the consumption or processing metrics represented by the usage history can be allocated to one cloud, such as the target cloud 102, and another portion of the consumption or processing metrics represented by the usage history can be allocated to another cloud that may or may not be associated with the administrator 306 and/or the target cloud 102.

In further embodiments, the optimization module 302 can determine one or more combinations of utilization ratios that can be deemed a highly or sufficiently optimized configuration. For example, one utilization ratio of 60% can be combined with another utilization ratio of 38% for a combined utilization ratio of 98%. In these cases, the optimization module 302 can determine a configuration whereby the end users of the respective clouds with the utilization ratios of 60% and 38% can utilize the resources within the target cloud 102 in combination. It should be appreciated that other calculations and variables can be used to determine which of the set of usage histories produce the most preferred or best available utilization ratio of the resources in the target cloud 102.

In embodiments, the optimization module 302 can notify the administrator 306 of the determined most preferred usage history. In embodiments, the administrator 306 can be notified of any of the results of the simulations, in any way, and via any data communication. Further, in embodiments, the optimization module 302 can generate or provide a deployment recommendation or offer to an administrator, owner, or other user associated with any of the set of clouds 304. For example, if the resources of the target cloud 102 would be preferably optimized with a usage history associated with cloud A of the set of clouds 304, then the administrator 306 can contact an administrator of cloud A in an effort to entice the administrator of cloud A to enter into an agreement with the administrator 306 for use of the resources of the target cloud 102. It should be appreciated that the administrator 306 or other entity can contact an administrator associated with any of the set of clouds 304, or other clouds, in any way, with any type of information or offer.

Figure 4:
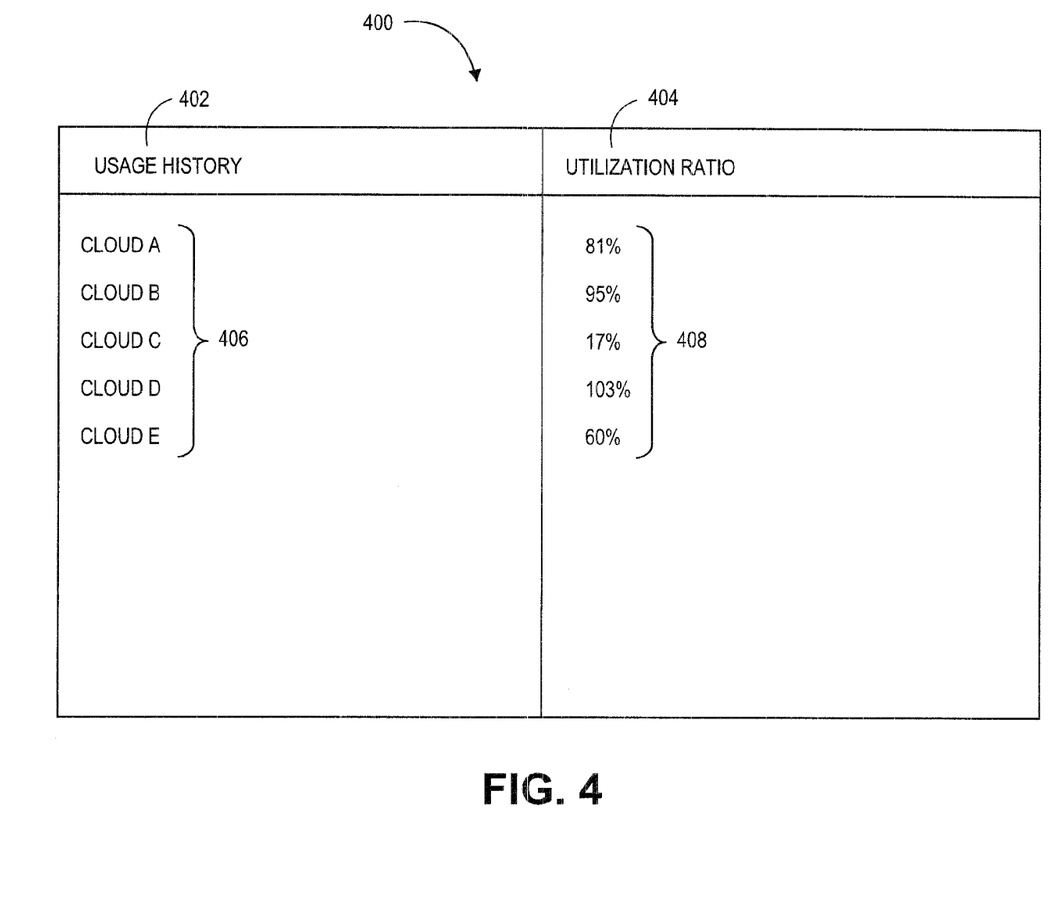
FIG. 4 illustrates an exemplary chart identifying usage histories, according to various embodiments.

FIG. 4 is an exemplary chart 400 resulting from an exemplary simulation of resources in an exemplary target cloud. It should be appreciated that the values, variables, columns, and arrangements as shown in FIG. 4 are for illustration purposes and can be any value, variable, and arrangement. The chart 400 can comprise a usage history column 402 and a utilization ratio column 404. The usage history column 402 can comprise a set of values 406 that can indicate a cloud with a corresponding usage history. For example, as shown in FIG. 4, the set of values 406 indicate exemplary clouds A-E with corresponding usage histories. The utilization ratio column 404 can comprise a set of utilization ratios 408 for a target cloud that can each respectively correspond to a utilization ratio, within the target cloud, of usage histories of the clouds in the set of values 406, as described herein. For example, as shown in FIG. 4, the usage history of cloud A has a utilization ratio of 81% in the target cloud, the usage history of cloud B has a utilization ratio of 95% in the target cloud, and so on.

The optimization module 302 can compare the set of utilization ratios 408 to determine which cloud, or which combination of clouds, would provide a highly or sufficiently optimized resource usage within the target cloud. For example, as shown in FIG. 4, assuming that the most preferred utilization ratio is the utilization ratio that is closest to 100% but not over 100%, then the optimization module 302 can determine that cloud B, with a utilization ratio of 95%, would provide the most preferred resource usage within the target cloud. For further example, as shown in FIG. 4, assuming that the most preferred utilization ratio is the utilization ratio that is closest to 100%, including values over 100%, then the optimization module 302 can determine that cloud D, with a utilization ratio of 103%, would provide the most preferred resource usage within the target cloud.

For further example, the optimization module 302 can determine combinations of the utilization ratios that are closest to 100%. For example, the utilization ratio of cloud A (81%) combined with the utilization ratio of cloud C (17%), produces a combined utilization ratio of 98%, which is closer to 100% than both the utilization ratio of cloud B (95%) and the utilization ratio of cloud D (103%). It should be appreciated that other calculations are envisioned when determining which usage history provides the most preferred resource usage within the target cloud.

Figure 5:
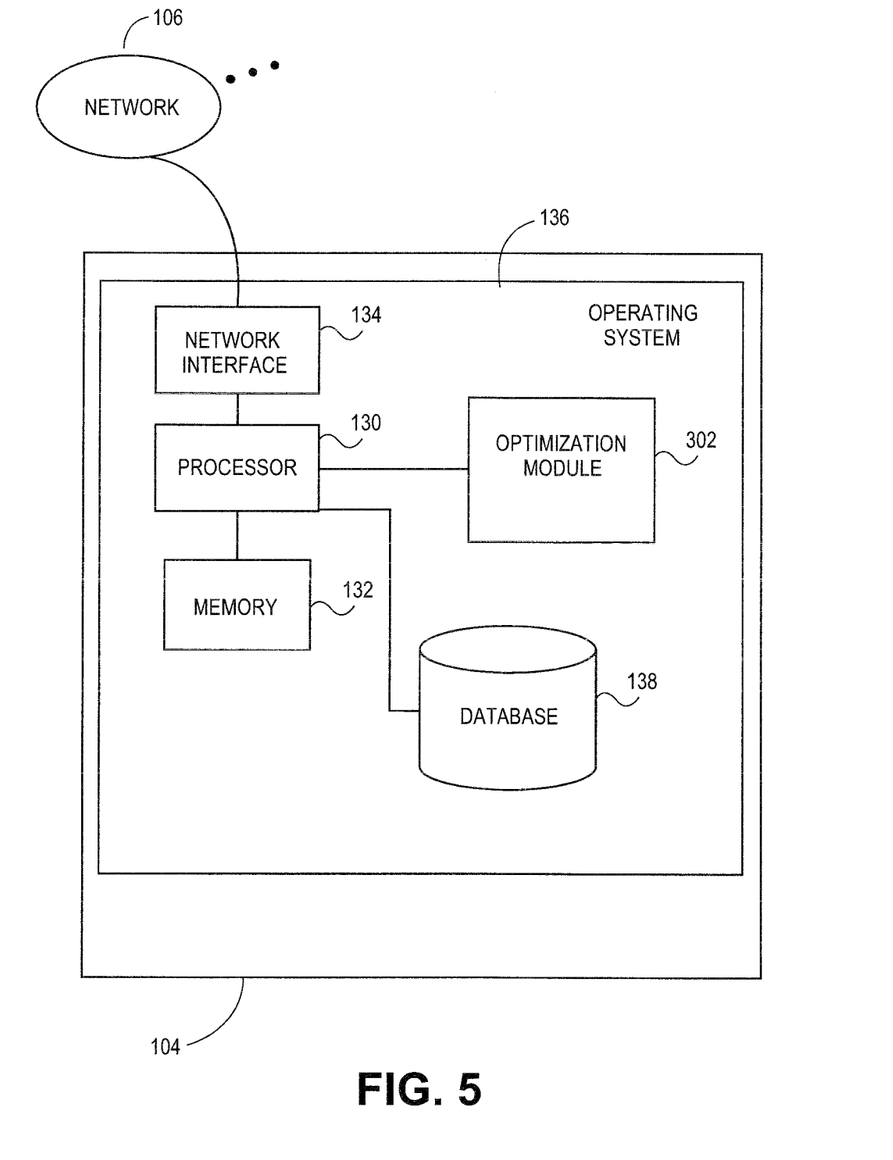
FIG. 5 illustrates an exemplary hardware configuration for a cloud-based management system, according to various embodiments.

FIG. 5 illustrates an exemplary diagram of hardware and other resources that can be incorporated in a cloud management system 104 configured to communicate with a set of instantiated virtual machines 116 (as shown in FIG. 2) via one or more networks 106, according to embodiments. In embodiments as shown, the cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with one or more computer readable storage medium 138, such as hard drives, optical storage, databases, and the like. Processor 130 further communicates with network interface 134, such as an Ethernet or wireless data connection, which in turn communicates with one or more networks 106, such as the Internet or other public or private networks.

Processor 130 can also communicate with computer readable storage medium 138 and the optimization module 302, to execute control logic, identify usage histories for producing optimized cloud utilization in the cloud 102 as described herein, and control the operation of virtual machines and other resources in cloud 102. Other configurations of cloud management system 104, associated network connections, and other hardware and software resources are possible.

Figure 6:
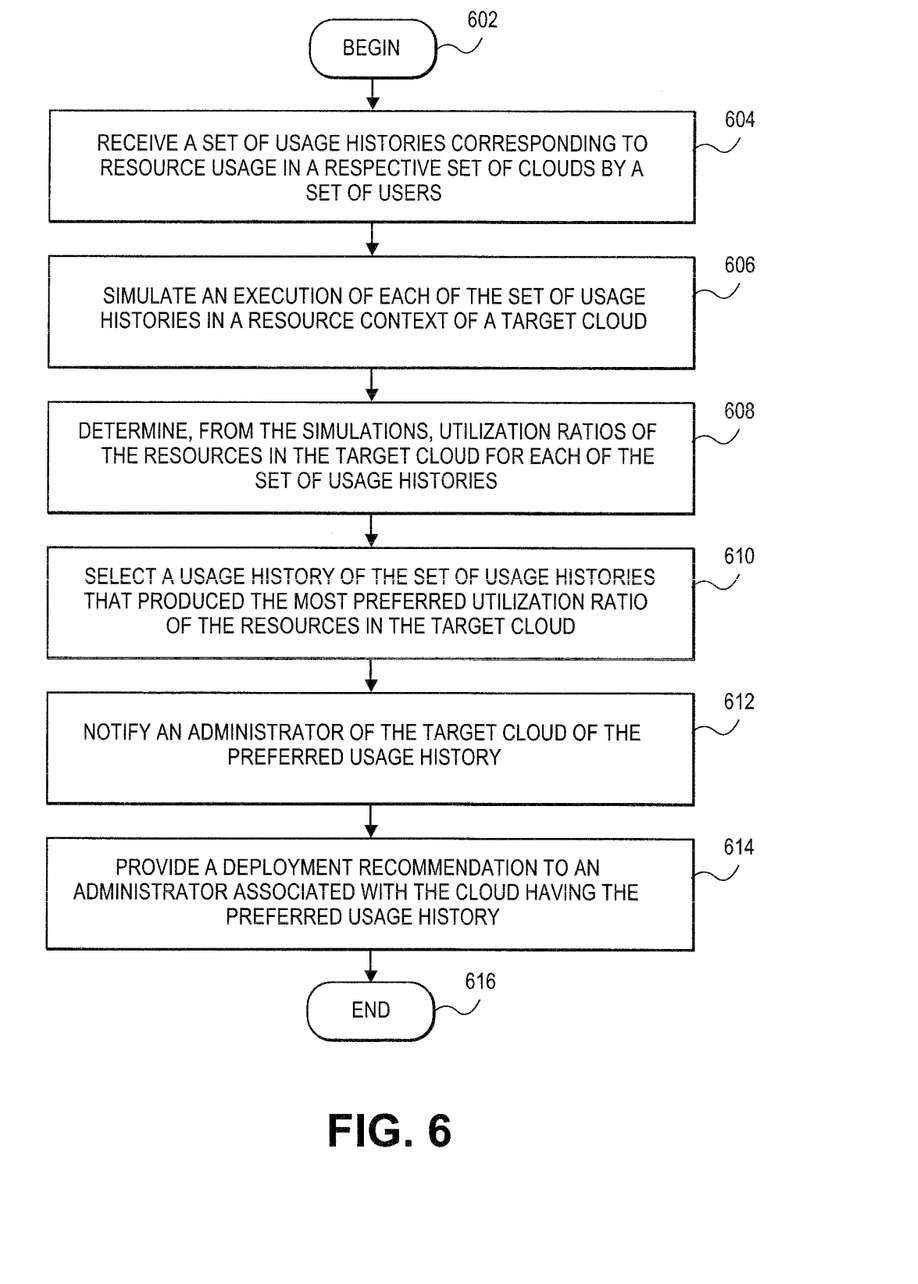
FIG. 6 illustrates a flowchart for identifying usage histories for producing optimized cloud utilization, according to various embodiments.

FIG. 6 illustrates a flowchart for identifying optimized utilization in a target cloud computing environment, according to various embodiments. In 602, processing can begin. In 604, a set of usage histories can be received. In embodiments, a target cloud can receive the set of usage histories. Further, in embodiments, the set of usage histories can correspond to resource usage by end users in a respective set of other clouds. In embodiments, the resource usage can be any processing or consumption metrics related to hardware, storage, software, and other resources within the other clouds.

In 606, an execution of each the set of usage histories on resources in the target cloud can be simulated, projected, modeled, evaluated, or the like. In embodiments, the processing and/or consumption metrics, as reported in the usage histories, that occurred in the other clouds can be applied to and analyzed with respect to at least one of the resources of the target cloud. In 608, a utilization ratio of the resources in the target cloud for each of the set of usage histories can be determined from the simulations. In embodiments, the utilization ratio can indicate a percentage of one or more of the resources of the target cloud that are utilized in the simulation. Further, in embodiments, the utilization ratio can be any value in the range of 0% to over 100%.

In 610, the usage history with the most preferred utilization ratio of the resources in the target cloud can be selected. In embodiments, a preferred utilization ratio can be the utilization ratio that is closest to 100%, including or excluding utilization ratios that are greater than 100%. Further, in embodiments, there can be multiple usage histories that have a preferred utilization ratio, for example if the multiple usage histories indicate the same percentage of utilized resources. In 612, an administrator of the target cloud can be notified of the one or more usage histories that have the most preferred utilization ratios.

In 614, a deployment recommendation or offer can be provided to an administrator or entity associated with the cloud with the usage history that has the most preferred utilization ratio. In embodiments, the deployment recommendation can comprise an offer to the administrator or entity to employ use of the resources of the target cloud. Further, in embodiments, the offer can be directed to multiple administrators or entities associated with multiple clouds having the most preferred user histories. Still further, in embodiments, the administrators or entities can be any user or owner associated with the clouds or anyone who has decision-making authority regarding the managing of cloud providers.

The foregoing description is illustrative, and variations in configuration and implementation may occur to persons skilled in the art. For example, while embodiments have been described which operate using one optimization module 302 and associated cloud management system 104, in embodiments, one or more of optimization module 302 and associated cloud management system 104, and/or other servers, data stores, and/or other logic or resources can be used. For further example, while embodiments have been described in which files associated with cloud resources are monitored, in embodiments, the files can be monitored at any time or interval. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, comprising:
receiving, by a processor, a plurality of resource usage histories describing resource usage in a plurality of clouds;
determining, in view of the plurality of resource usage histories, a plurality of resource utilization rates;
identifying, in view of the of resource utilization rates, an optimal resource usage history which optimizes resource usage in a first cloud; and
determining that the optimal usage history is based on a resource utilization rate exceeding a pre-defined usage rate of a resource; and
identifying a second cloud comprising the resource to accommodate resource usage exceeding the pre-defined usage level.

2. The method of claim 1, further comprising notifying an administrator of the optimal usage history.

3. The method of claim 1, further comprising:
generating a deployment recommendation for the optimal usage history.

4. The method of claim 1, wherein determining the plurality of utilization rates comprises:
simulating execution the plurality of usage histories in a cloud.

5. The method of claim 1, wherein each resource utilization rate of the plurality of resource utilization rates indicates a ratio of utilizing a resource.

6. The method of claim 1, wherein identifying the optimal usage history comprises identifying a resource utilization rate that is closest to a pre-defined maximum resource usage rate.

7. The method of claim 1, wherein identifying the optimal usage history comprises identifying at least two resource utilization rates a sum of which is closest to a pre-defined maximum resource usage rate.

8. The method of claim 1, wherein each resource usage history of the plurality of resource usage histories comprises resource consumption data.

9. The method of claim 1, wherein the pre-defined usage rate of a resource equals to 100% usage of the resource.

10. A system, comprising:
a memory; and
processor, communicatively coupled to the memory, the processor to perform operations comprising:
receiving a plurality of resource usage histories describing resource usage in a plurality of clouds;
determining, in view of the plurality of resource usage histories, a plurality of resource utilization rates;
identifying, in view of the plurality of resource utilization rates, an optimal resource usage history which optimizes resource usage in a first cloud; and
determining that the optimal usage history is based on a resource utilization rate exceeding a pre-defined usage rate of a resource; and
identifying a second cloud comprising the resource to accommodate resource usage exceeding the pre-defined usage level.

11. The system of claim 10, wherein the operations further comprise notifying an administrator of the optimal usage history.

12. The system of claim 10, wherein the operations further comprise:
generating a deployment recommendation for the optimal usage history.

13. The system of claim 10, wherein determining the plurality of utilization rates comprises:
simulating execution the plurality of usage histories in a cloud.

14. The system of claim 10, wherein each resource utilization rate of the plurality of resource utilization rates indicates a ratio of utilizing a resource.

15. The system of claim 10, wherein identifying the optimal usage history comprises identifying a resource utilization rate that is closest to pre-defined maximum resource usage rate.

16. The system of claim 10, identifying the optimal usage history comprises identifying at least two resource utilization rates a sum of which is closest to a pre-defined maximum resource usage rate.

17. The system of claim 10, wherein each resource usage history of the plurality of resource usage histories comprises resource consumption data.

18. The system of claim 10, wherein the pre-defined usage rate of a resource equals to 100% usage of the resource.

* * * * *